N. L. CALDWELL.
TIRE REMOVING APPARATUS.
APPLICATION FILED JULY 22, 1919.
1,352,722.
Patented Sept. 14, 1920.
2 SHEETS—SHEET 2.
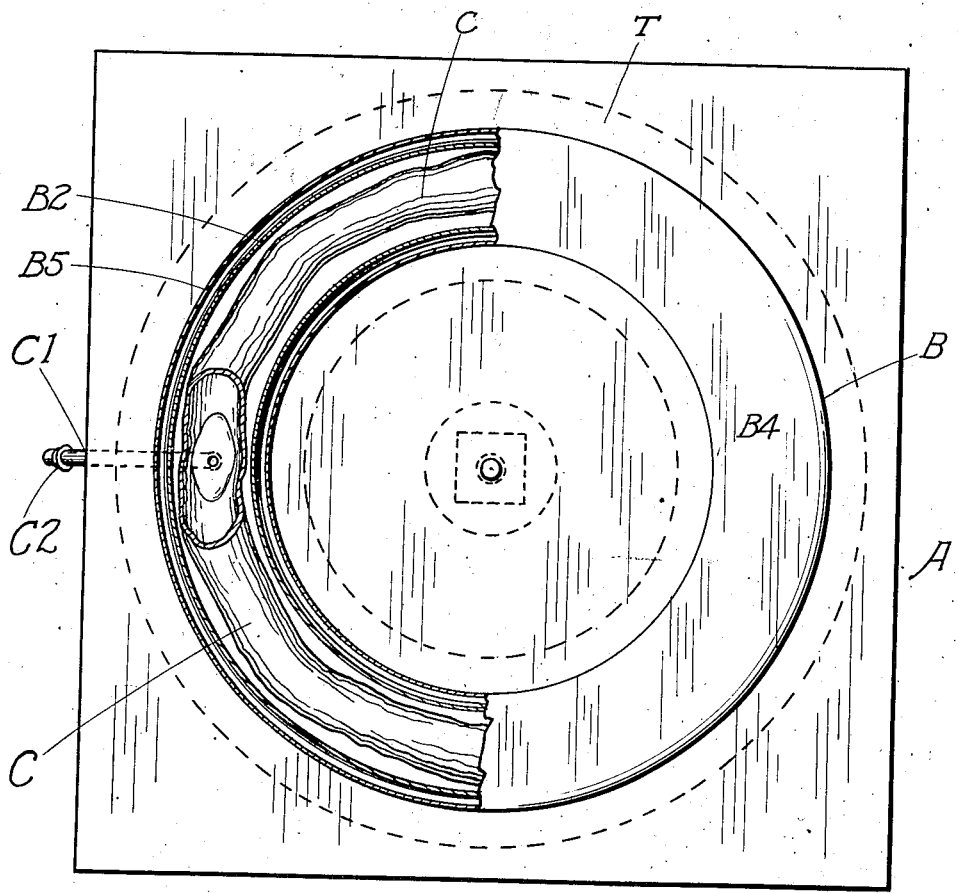
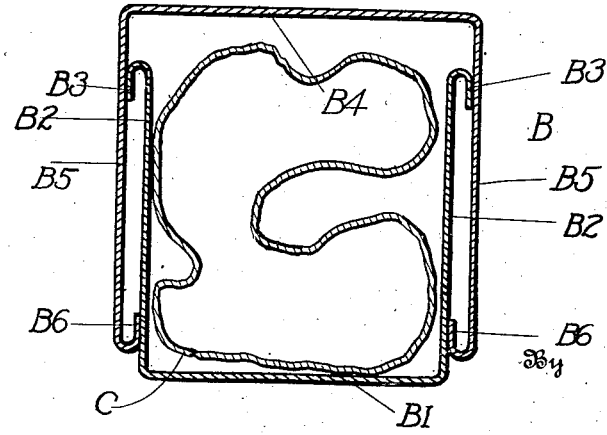

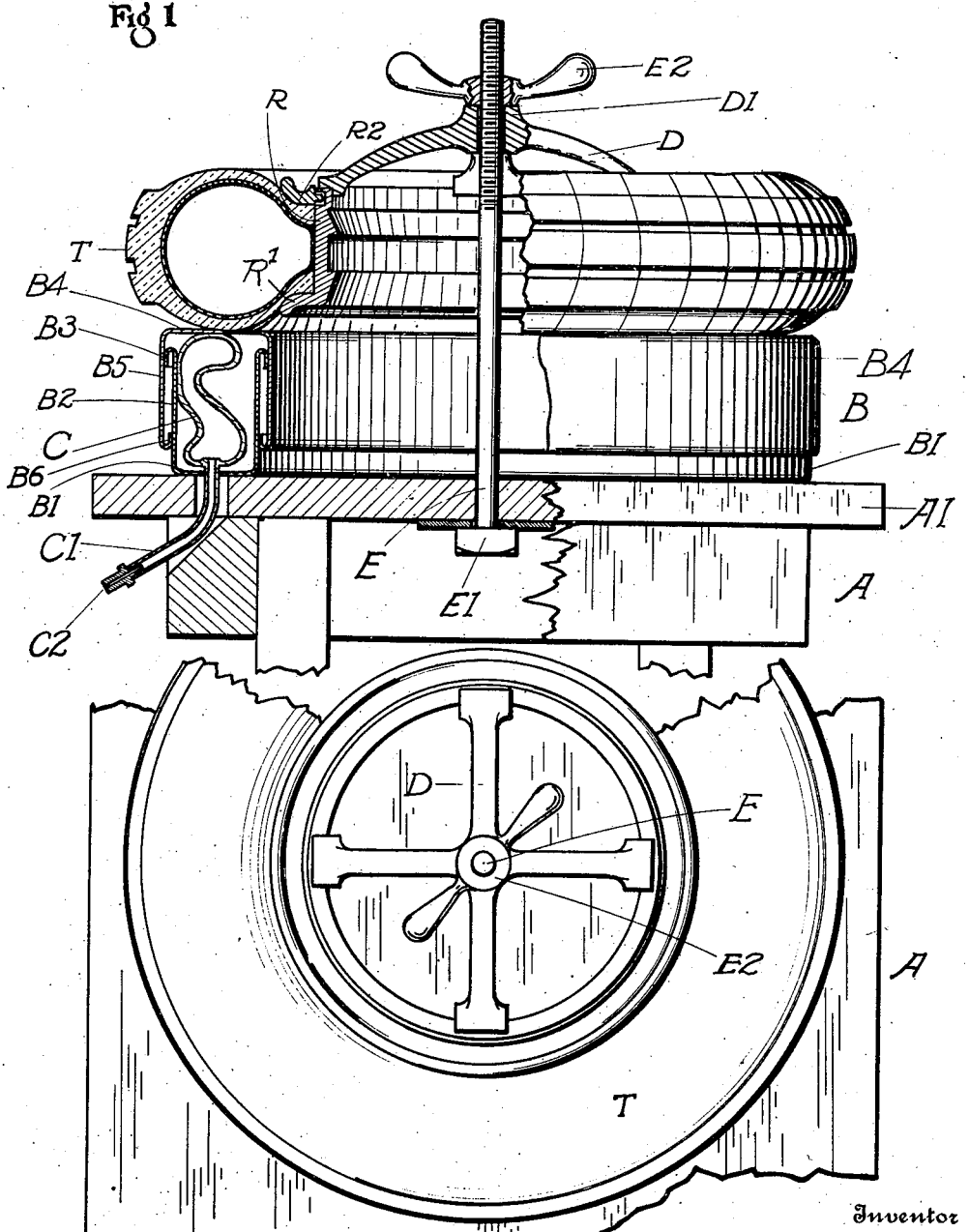

UNITED STATES PATENT OFFICE.

NOAH L. CALDWELL, OF KNOXVILLE, TENNESSEE.

TIRE-REMOVING APPARATUS.

1,352,722.  Specification of Letters Patent.  Patented Sept. 14, 1920.

Application filed July 22, 1919. Serial No. 312,623.

*To all whom it may concern:*

Be it known that I, NOAH L. CALDWELL, a citizen of the United States, residing at Knoxville, in the county of Knox and State of Tennessee, have invented a new and useful Improvement in Tire-Removing Apparatus, of which the following is a specification, reference being had to the accompanying drawing.

My improvement relates particularly to apparatus for removing heavy pneumatic tires from continuous, rigid sheet metal rims.

The object of the invention is to produce such an apparatus by which ample power can be readily applied to the tire and the rim for the separation of these two members from each other, the operation being quickly performed and in such manner as to avoid injury to the tire and the rim.

In the accompanying drawings,

Figure 1 is a sectional elevation illustrating my improved apparatus, a tire and rim being in position on the apparatus ready for separation;

Fig. 2 is a plan of the mechanism shown in Fig. 1, parts being broken away;

Fig. 3 is a sectional plan of a portion of the apparatus, the tire and rim being absent;

Fig. 4 is an upright transverse section of the annular expansion structure.

Referring to said drawings, A is a table having a strong top, $A^1$. On the table lies an annular, expansion structure, B. This structure is of approximately the same diameter as the tire, T, in order that the tire may be supported on the structure, as shown in Fig. 1, the interior of the annular structure being larger than the largest diameter of the rim, R, in order that the upper section of the annular structure may move upward around the rim during the upward movement of the tire.

The rim may be of any form which is continuous and rigid—not cut nor jointed transversely. The drawings show such a rim having a fixed flange, $R^1$, and a removable flange, $R^2$, of well-known construction. Before the tire is placed upon the apparatus, the flange, $R^2$, is removed.

The apparatus also includes a spider, D, the arms of which are adapted to rest upon the upper edge of the rim, R, when the tire has been placed into position on the upper face of the expansion structure, B. A bolt, E, extends upward through the table top, $A^1$, and through the spider, D. At its lower end the bolt has a head, $E^1$. The upper end of the bolt extends loosely through the hub, $D^1$, of the spider and is screw threaded. Above said hub the bolt is surrounded by a nut, $E^2$, which is interiorly secrew threaded to conform to the threading of the bolt. By means of said nut, the spider is held against upward movement while the tire is being pressed upward by the expansion structure.

The annular expansion structure, B, has a lower section, $B^1$, and an upper section, $B^4$. The section, $B^1$, has rising side walls, $B^2$. The upper edge of each such wall is turned outward to form a flange, $B^3$, which constitutes a hook. The upper section, $B^4$, has two descending side walls, $B^5$, which overlap the walls, $B^2$. Each of the walls, $B^5$, has its lower edge turned inward and upward to form a flange, $B^6$, which constitutes a hook adapted to enter the space between the flange, $B^3$, and the wall, $B^2$, when the upper section is moved upward. The purpose of this inter-engagement is to avoid a complete separation of the members, $B^1$ and $B^4$, from each other when compressed air is admitted into the inner tube, C.

The tube, C, is a pliable tube similar to the slidable inner tubes used in ordinary pneumatic tires. Said tube is large enough to require folding transversely to place it into the annular chamber formed by the sections, $B^1$ and $B^4$, of the expansion structure. A branch tube, $C^1$, extends from the tube, c, downward through the table top, $A^1$, and is provided at its lower end with a nipple, $C^2$, for connecting a tube leading from a source of compressed air supply.

Before the tire is to be placed upon the expansion structure, the tube, C, is to be collapsed and the section, $B^4$, put into its lowest position. When the tire is in position upon the expansion structure and the spider, D, has been put into engagement with the rim, R, (the flange, $R^2$, having been detached, as above described) compressed air is admitted into the branch tube, $C^1$. This results in the gradual inflation of the tube, C, whereby the upper section, $B^4$, of the expansion structure is lifted. This causes the tire, T, to move upward, the tire sliding transversely over the outer face of the rim.

In practice it has been found that a relatively low air pressure within the tube, C, is sufficient to exert a large aggregate force on the tire; this being due to the fact that one of the sections of the expansion structure is a piston presenting a large area. By means of this apparatus, the large pneumatic tires used on heavy auto trucks are easily removed from their rims. It is well known that the removal of such tires from the rims by the use of hand tools is a laborious and tedious task and usually this task can not be accomplished without injury to the tire and the rim.

I claim as my invention.

1. In an apparatus for the separation of two annular members one of which is a metal rim and the other of which is a rubber tire surrounding said rim, the combination of an annular expansion structure adapted to engage one of said members and to be expanded in the direction parallel to the axis of said member by the introduction into said structure of fluid under pressure, and means for engaging the other of said members and holding it against movement, substantially as described.

2. In an apparatus for the separation of two annular members one of which is a metal rim and the other of which is a rubber tire surrounding said rim, the combination of an annular expansion structure adapted to engage one of said members and to be expanded in the direction parallel to the axis of said member by the introduction into said structure of fluid under pressure, and a spider for engaging the other of said members and holding it against movement, substantially as described.

3. In an apparatus of the nature described, an annular expansion structure adapted to engage a tire and to be expanded in the direction parallel to the axis of said structure by the introduction into said structure of fluid under pressure, and means for engaging a rim on said tire and holding the rim against movement, substantially as described.

4. In an apparatus of the nature described, an annular expansion structure adapted to engage a tire and comprising metal walls and an inner pliable tube adapted to be inflated by the insertion of fluid under pressure, and means for engaging a rim on said tire and holding the rim against movement, substantially as described.

5. In an apparatus of the nature described, an annular expansion structure adapted to support a tire and comprising two annular sections having over-lapping walls and a pliable tube adapted to be inflated by fluid under pressure, and means for engaging a rim on said tire and holding the rim against movement, substantially as described.

6. In an apparatus of the nature described, an annular expansion structure adapted to engage a tire and to be expanded in the direction parallel to the axis of said structure by the introduction into said structure of fluid under pressure, and a spider for engaging a rim on said tire and holding the rim against movement, substantially as described.

7. In an apparatus of the nature described, an annular expansion structure adapted to engage a tire and comprising metal walls and an inner pliable tube adapted to be inflated by the insertion of fluid under pressure, and a spider for engaging a rim on said tire and holding the rim against movement, substantially as described.

8. In an apparatus of the nature described, an annular expansion structure adapted to support a tire and comprising two annular sections having over-lapping walls and a pliable tube adapted to be inflated by fluid under pressure, and a spider for engaging a rim on said tire and holding the rim against movement, substantially as described.

In testimony whereof I have signed my name this 18th day of July, in the year one thousand nine hundred and nineteen.

NOAH L. CALDWELL.